(12) United States Patent
Oh et al.

(10) Patent No.: US 10,177,941 B2
(45) Date of Patent: Jan. 8, 2019

(54) METHOD AND APPARATUS FOR ESTIMATING AND CORRECTING PHASE ERROR IN WIRELESS COMMUNICATION SYSTEM

(71) Applicant: Samsung Electronics Co., Ltd, Gyeonggi-do (KR)

(72) Inventors: Jongho Oh, Gyeonggi-do (KR); Hyoungjin Lim, Gyeonggi-do (KR); Jaewon Kim, Seoul (KR); Hyunkyu Yu, Gyeonggi-do (KR); Hyunil Yoo, Gyeonggi-do (KR); Kyungwhoon Cheun, Seoul (KR); Jisung Oh, Seoul (KR); Kilsik Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/418,624

(22) Filed: Jan. 27, 2017

(65) Prior Publication Data

US 2017/0214518 A1    Jul. 27, 2017

(30) Foreign Application Priority Data

Jan. 27, 2016 (KR) .......... 10-2016-0010235
Apr. 25, 2016 (KR) .......... 10-2016-0049882

(51) Int. Cl.
*H04L 25/03* (2006.01)
*H04L 27/38* (2006.01)

(52) U.S. Cl.
CPC .... *H04L 25/03012* (2013.01); *H04L 27/3872* (2013.01)

(58) Field of Classification Search
CPC .... H04L 7/04; H04L 5/0048; H04L 25/03012
(Continued)

(56) References Cited

U.S. PATENT DOCUMENTS

| 9,054,933 B2 | 6/2015 | Arambepola et al. |
| 2002/0064240 A1* | 5/2002 | Joshi ............ H04L 27/152 |
| | | 375/326 |

(Continued)

FOREIGN PATENT DOCUMENTS

| WO | 2015006218 A1 | 1/2015 |
| WO | 2015165533 A1 | 11/2015 |
| WO | 2016000915 A1 | 1/2016 |

OTHER PUBLICATIONS

Foreign Communication from Related Counterpart Application; PCT Patent Application No. PCT/KR2017/000933; International Search Report dated Apr. 25, 2017; 4 pages.

(Continued)

*Primary Examiner* — Michael Neff

(57) ABSTRACT

Provided are a method and apparatus for estimating and correcting the phase error in 5G or pre-5G communication systems providing much higher data rates compared to existing 4G communication systems including LTE systems. The existing phase error estimation scheme using a cyclic prefix in the time domain may fail to prevent performance degradation due to inter-carrier interference. In the present invention, it is possible to enhance reception performance of the receiver by estimating and correcting the phase error multiple times within a symbol using a time domain signal and by reducing the influence of inter-carrier interference.

20 Claims, 15 Drawing Sheets

(58) Field of Classification Search
USPC .......................................................... 375/347
See application file for complete search history.

(56) References Cited

U.S. PATENT DOCUMENTS

| | | | |
|---|---|---|---|
| 2005/0147186 A1* | 7/2005 | Funamoto | H04L 27/2605 375/324 |
| 2005/0163094 A1* | 7/2005 | Okada | H04L 27/2605 370/343 |
| 2008/0205494 A1* | 8/2008 | Whitehead | G01S 19/29 375/150 |
| 2008/0315928 A1* | 12/2008 | Waheed | G04F 10/005 327/159 |
| 2013/0088395 A1* | 4/2013 | Vaarakangas | G01S 3/48 342/378 |
| 2013/0136165 A1 | 5/2013 | Shirakata et al. | |
| 2013/0235922 A1 | 9/2013 | Wang et al. | |
| 2015/0155961 A1 | 6/2015 | Khoryaev et al. | |
| 2016/0192335 A1* | 6/2016 | Kusashima | H04L 5/0053 370/280 |

OTHER PUBLICATIONS

Songping Wu et al., "Phase Noise Estimation and Mitigation for OFDM Systems", IEEE Transactions on Wireless Communications, vol. 5, No. 12, Dec. 1, 2006, pp. 3616-3625.

Mikko Valkama et al., "Impact and Digital Suppression of Oscillator Phase Noise in Radio Communications", Microwave and Millimeter Wave Circuits and Systems, Oct. 26, 2012, pp. 103-133.

Supplementary European Search Report dated Nov. 26, 2018 in connection with European Patent Application No. 17 74 4578, 11 pages.

* cited by examiner

METHOD AND APPARATUS FOR ESTIMATING AND CORRECTING PHASE ERROR IN WIRELESS COMMUNICATION SYSTEM

CROSS-REFERENCE TO RELATED APPLICATION(S) AND CLAIM OF PRIORITY

The present application is related to and claims priority under 35 U.S.C. 119(a) to Korean patent application no. 10-2016-0010235, which was filed in the Korean intellectual property office on Jan. 27, 2016, and Korean patent application no. 10-2016-0049882, which was filed in the Korean intellectual property office on Apr. 25, 2016, the entire contents of each of which are incorporated herein by reference.

TECHNICAL FIELD

The present invention relates to a method and apparatus for estimating and correcting the phase error in a wireless communication system based on orthogonal frequency-division multiplexing (OFDM).

BACKGROUND

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems.

To achieve high data rates, use of the extremely high frequency (mmWave) band (e.g. 60 GHz band) is expected in a 5G communication system. To reduce propagation path loss and to increase propagation distance in the mmWave band, use of various technologies such as beamforming, massive MIMO, full dimensional MIMO (FD-MIMO), array antenna, analog beamforming and large scale antenna are under discussion for 5G communication systems.

To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems.

In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access technologies.

In an existing wireless communication system based on orthogonal frequency-division multiplexing (OFDM), for phase error estimation in the frequency domain, the common phase error (CPE) affecting all OFDM subcarriers is estimated and corrected using a reference signal, and, for inter-carrier interference (ICI) reduction in the time domain, the phase error is estimated and corrected on a per-symbol basis using a cyclic prefix.

However, when the phase error rapidly changes in the symbol duration, phase error correction using a cyclic prefix may fail to significantly reduce the influence of inter-carrier interference. Particularly, in the case of a millimeter wave communication system, as the phase error occurs severely owing to characteristics of radio frequency integrated circuits (RFIC), phase error estimation on a per-symbol basis alone may fail to prevent performance degradation due to inter-carrier interference.

SUMMARY

To address the above-discussed deficiencies, it is a primary object to provide a method and apparatus for estimating and correcting the phase error in a wireless communication system based on OFDM. In particular, an aspect of the present invention is to provide a method and apparatus for estimating the phase error within a symbol.

In accordance with an aspect of the present invention, there is provided a method of phase error estimation and correction for a receiver. The method may include: receiving a time-domain signal; filtering the received time-domain signal; and estimating the phase error using the filtered time-domain signal, wherein a correlation regarding the time-domain signal is used for phase error estimation.

In accordance with another aspect of the present invention, there is provided a receiver capable of phase error estimation and correction. The receiver may include: a receive circuitry to receive a time-domain signal; and a controller to control a process of filtering the received time-domain signal, and estimating the phase error using the filtered time-domain signal, wherein a correlation regarding the time-domain signal is used for phase error estimation.

In accordance with another aspect of the present invention, there is provided a method for a transmitter to send a reference signal for phase error estimation. The method may include: generating sequences of a reference signal; determining a resource to which the reference signal is to be mapped; mapping the reference signal to the determined resource; and sending the mapped reference signal to a receiver, wherein the sequences of the reference signal are correlated in the time domain.

In accordance with another aspect of the present invention, there is provided a transmitter capable of sending a reference signal for phase error estimation. The transmitter may include: a transmit circuitry to send a reference signal to a receiver; and a controller to control a process of generating sequences of the reference signal, determining a resource to which the reference signal is to be mapped, mapping the reference signal to the determined resource, and sending the mapped reference signal to the receiver, wherein the sequences of the reference signal are correlated in the time domain.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
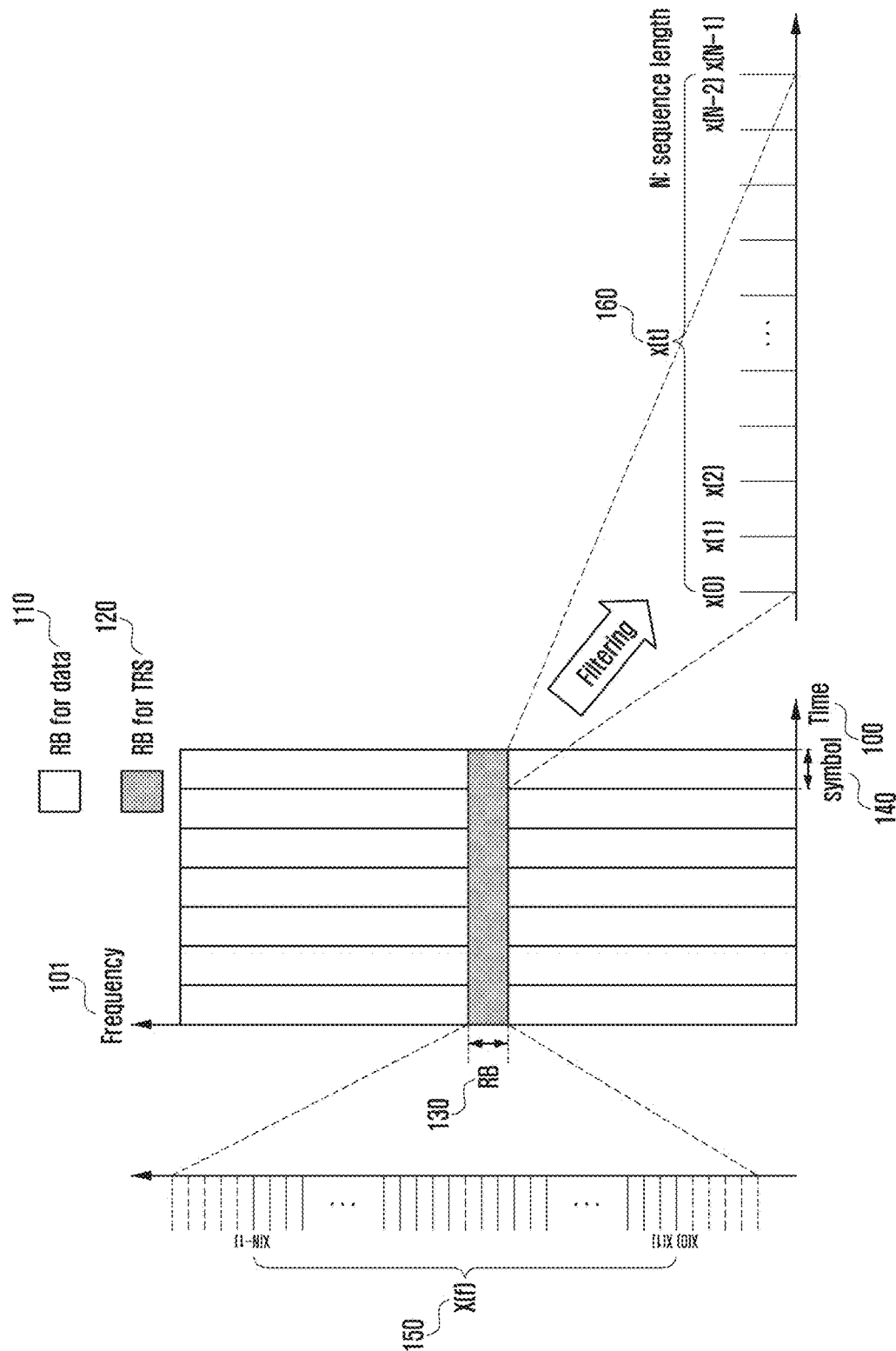
FIG. 1 illustrates an example representation of a transmission signal according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, exemplary embodiments of the present invention are described in detail with reference to the accompanying drawings. Descriptions of functions and structures well known in the art and not directly related to the present invention may be omitted to avoid obscuring the subject matter of the present invention. The terms and words used in the following description are not limited to the bibliographical meanings, but, are merely used by the inventor to enable a clear and consistent understanding of the present invention. Hence, these terms should be interpreted as having a meaning that is consistent with their meaning in the context of the specification and relevant art.

It should be understood by those skilled in the art that the subject matter of the present invention is applicable to other systems having similar technical backgrounds without significant modifications departing from the scope of the present invention.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

For phase error estimation in an existing wireless communication system based on OFDM, the common phase error (CPE) is estimated and corrected using a reference signal in the frequency domain. However, in the frequency domain, the receiver can correct common phase error components only but cannot correct random phase error components affecting inter-carrier interference (ICI). In the time domain, the receiver may reduce ICI by estimating and correcting the phase error on a per-symbol basis using a cyclic prefix.

As the existing error estimation scheme uses a cyclic prefix in the time domain, it can estimate the phase error only on a per-symbol basis. However, when the phase error rapidly changes in the symbol duration, phase error correction using a cyclic prefix may fail to significantly reduce the influence of inter-carrier interference. Particularly, in the case of a millimeter wave communication system, as the phase error occurs severely owing to characteristics of RFIC, phase error estimation on a per-symbol basis alone may fail to prevent performance degradation due to inter-carrier interference.

The present invention proposes a method and apparatus for estimating and correcting the phase error in a wireless communication system based on OFDM. In particular, it is possible to optimize the reception performance of the receiver by estimating the phase error within a symbol. To this end, the following description focuses on schemes for transmission and reception.

FIG. 1 illustrates an example representation of a transmission signal.

Referring to FIG. 1, resources of a typical OFDM-based wireless communication system may be represented in the time and frequency domains. In FIG. 1, the horizontal axis 100 indicates time, and the vertical axis 101 indicates frequency. A RB indicated by indicia 120 is used for a reference signal for phase error estimation (referred to as time-domain reference signal or TRS). A RB indicated by indicia 110 is used for data transmission. In the present invention, the property is used that a signal dense in the frequency domain can be transformed through filtering into a signal spread in the time domain. More specifically, length N frequency-domain signal $\{X(f)\}$, $f=0, 1, \ldots, N-1$ allocated to TRS RBs 120 may be converted through filtering and Inverse Fast Fourier Transform (IFFT) into time-domain signal $\{x(t)\}$, t=0, 1, ..., N−1 evenly distributed among symbols 140. Then, it is possible to estimate the phase error within a symbol on the basis of the time-domain signal $\{x(t)\}$.

In FIG. 1, it should be noted that the position in frequency of TRS may be changed. For example, TRS may be positioned in the center of the bandwidth or in another portion thereof.

Figure 2:
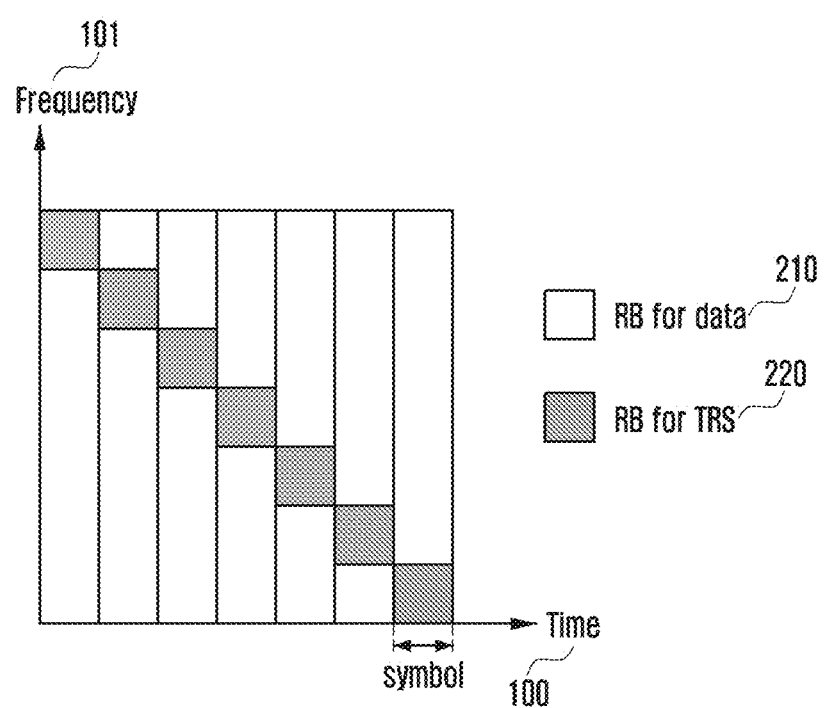
FIG. 2 illustrates an example allocation of TRSs to different frequencies on a per-symbol basis according to embodiments of the present disclosure.

FIG. 2 illustrates an example allocation of TRSs to different frequencies on a per-symbol basis. RBs 220 for TRSs are assigned to different frequencies on a per-symbol basis, and the remaining resources are RBs 210 for data. It is possible to perform channel estimation for multiple frequency bands by use of TRSs allocated as shown in FIG. 2.

Figure 3:
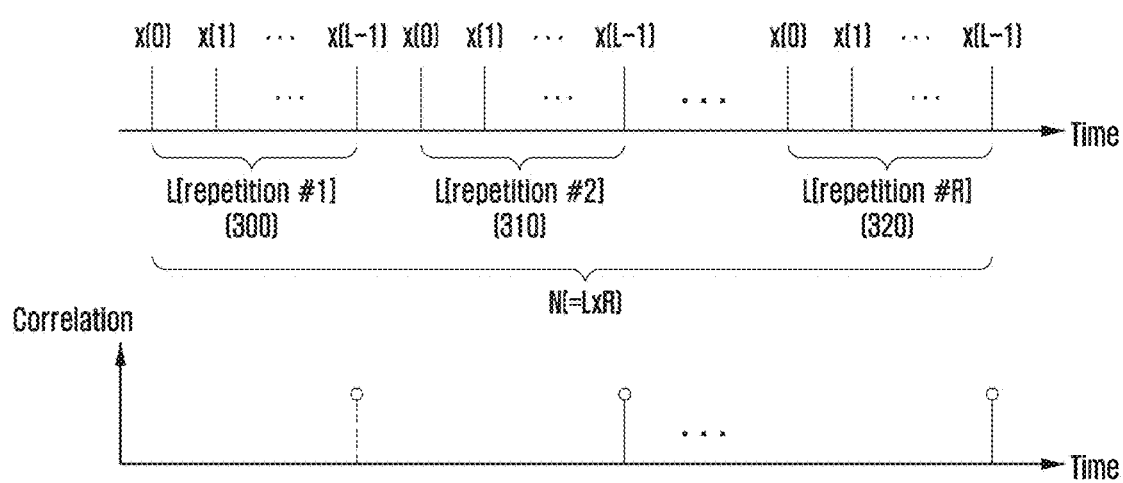
FIG. 3 illustrates an example first illustration of a time-domain signal {x(t)} according to embodiments of the present disclosure.

FIG. 3 illustrates an example first illustration of a time-domain signal $\{x(t)\}$.

As shown in FIG. 3, it is possible to compose a time-domain signal $\{x(t)\}$ by repeating a length L sequence x(0), x(1), ..., x(L−1) R times. That is, a length L sequence is repeated R times to form a length N time-domain signal $\{x(t)\}$ (N=L*R). Here, indicia 300, 310 and 320 indicate repetition 1, repetition 2, and repetition R, respectively. In this case, the receiver may obtain the phase difference by use of delay correlation between length L sequences or obtain the phase error by use of autocorrelation of a length L sequence, and correct the phase error on a cycle of L.

Figure 4:
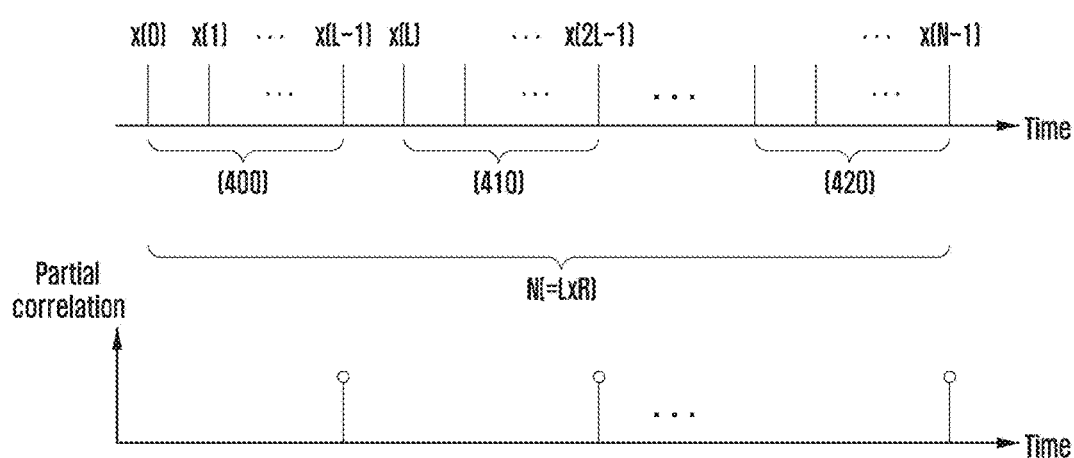
FIG. 4 illustrates an example second illustration of a time-domain signal {x(t)} according to embodiments of the present disclosure.

FIG. 4 illustrates an example second illustration of a time-domain signal $\{x(t)\}$.

As shown in FIG. 4, it is possible to compose a time-domain signal $\{x(t)\}$ by concatenating length L sequences. That is, length N time-domain signal $\{x(t)\}$ ..., N−1)=x(0), x(1), ..., x(L−1), x(L), x(L+1), ..., x(2L−1), ..., x(N−1). Here, indicia 400, 410 and 420 indicate length L sequences, respectively. Such sequences are an example of a time-domain signal. The time-domain signal $\{x(t)\}$ may be composed of partially correlated sequences. In this case, the receiver may correct the phase error by obtaining the same number of phase differences as the number of partial correlations. For example, the receiver may use quarter correlated sequences to thereby correct the phase error on a cycle of N/4.

Binary sequences may be used to form a time-domain signal. For example, assuming that N=16 and L=4, $\{x(0), x(1), x(2), x(3)\}$=[1, 1, 1, −1] in FIG. 3. In FIG. 4, $\{x(0), x(1), x(2), x(3)\}$=[−1, 1, 1, 1], $\{x(4), x(5), x(6), x(7)\}$=[1, −1, 1, 1], $\{x(8), x(9), x(10), x(11)\}$=−$\{x(0), x(1), x(2), x(3)\}$, $\{x(12), x(13), x(14), x(15)\}$=$\{x(4), x(5), x(6), x(7)\}$. Complex sequences such as Zadoff-Chu sequences may also be used. However, the present invention is not limited to binary or complex sequences, and other types of sequences may be used for a time-domain signal to obtain a gain in performance of the receiver. In FIG. 3 or 4, the number of correlations for phase error estimation may be reduced if necessary.

A time-domain signal $\{x(t)\}$ may be transformed through Fast Fourier Transform (FFT) into a frequency-domain signal $\{X(f)\}$, which may be allocated by the transmitter to RBs 120 as shown in FIG. 1. For filtering, the transmitter may not allocate the frequency-domain signal to the border resources in the frequency domain (dotted resources not corresponding to X(1), X(2), ..., X(N−1) in FIG. 1) or the central resource therein.

Figure 5:
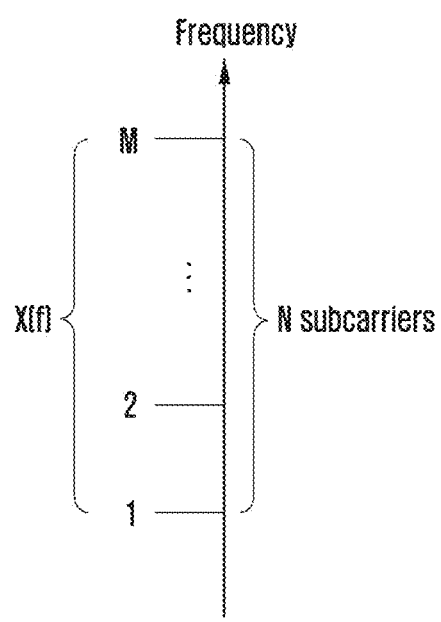
FIG. 5 illustrates an example frequency-domain signal {X(f)} corresponding to the time-domain signal {x(t)} according to embodiments of the present disclosure.

The receiver may estimate the common phase error by use of a frequency-domain signal $\{X(f)\}$. FIG. 5 illustrates an example frequency-domain signal $\{X(f)\}$ corresponding to the time-domain signal $\{x(t)\}$ of FIG. 3. In FIG. 5, the receiver may estimate the common phase error by use of M frequency-domain signal values mapped to specific frequency resources among N values of the frequency-domain signal $\{X(f)\}$ (M≤N). Similarly, in the case of the time-domain signal $\{x(t)\}$ of FIG. 4, the receiver may estimate the common phase error by use of M frequency-domain signal values mapped to specific frequency resources among N values of the frequency-domain signal $\{X(f)\}$ (M≤N).

Accordingly, the receiver may use a time-domain signal $\{x(t)\}$ on the basis of TRSs sent by the transmitter to estimate and correct the phase error within a symbol, reducing the influence of inter-carrier interference. In addition, the receiver may use a frequency-domain signal $\{X(f)\}$ to correct the common phase error.

Figure 6:
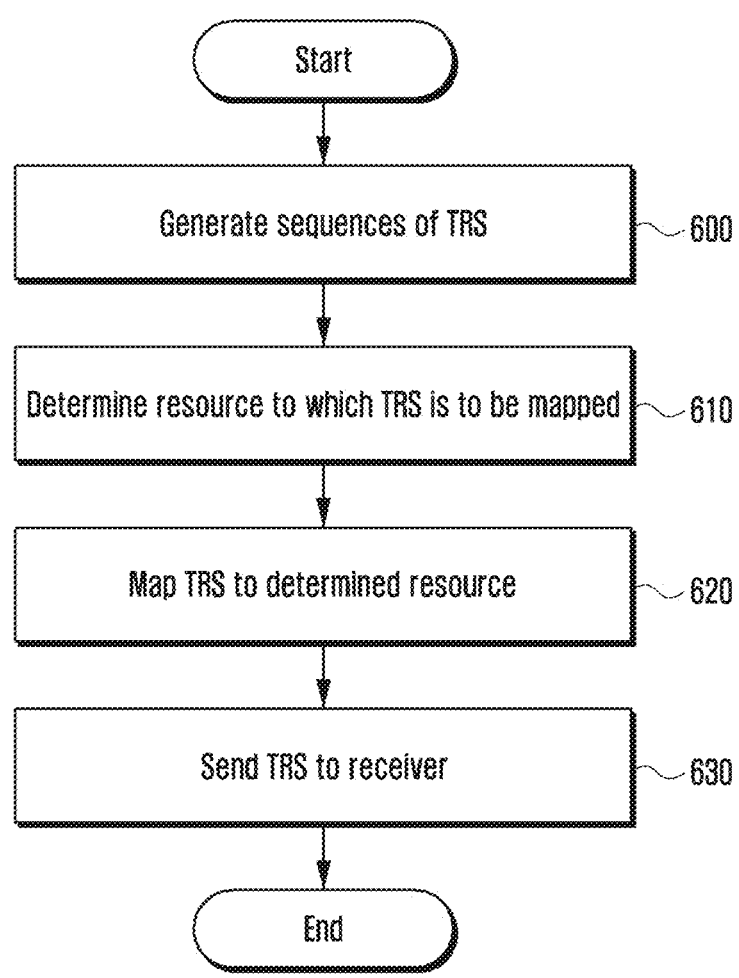
FIG. 6 illustrates a flowchart of a method for signal transmission of the transmitter according to embodiments of the present disclosure.

FIG. 6 illustrates a flowchart of a method for signal transmission of the transmitter.

Referring to FIG. 6, at step 600, the transmitter generates sequences of TRS. At step 610, the transmitter determines a resource to which TRS is to be mapped. At step 620, the transmitter maps TRS to the determined resource. At step 630, the transmitter sends TRS to the receiver. The TRS sequences may be obtained by applying FFT to a time-domain signal or obtained by using a preset sequence. The transmitter may determine the resource to which TRS is to be mapped as shown in FIG. 1 or 2. The transmitter may map data to be sent to those resources to which TRS is not mapped.

FIGS. 7A to 7D illustrate a flowchart describing a method for signal reception of the receiver.

Figure 7A:
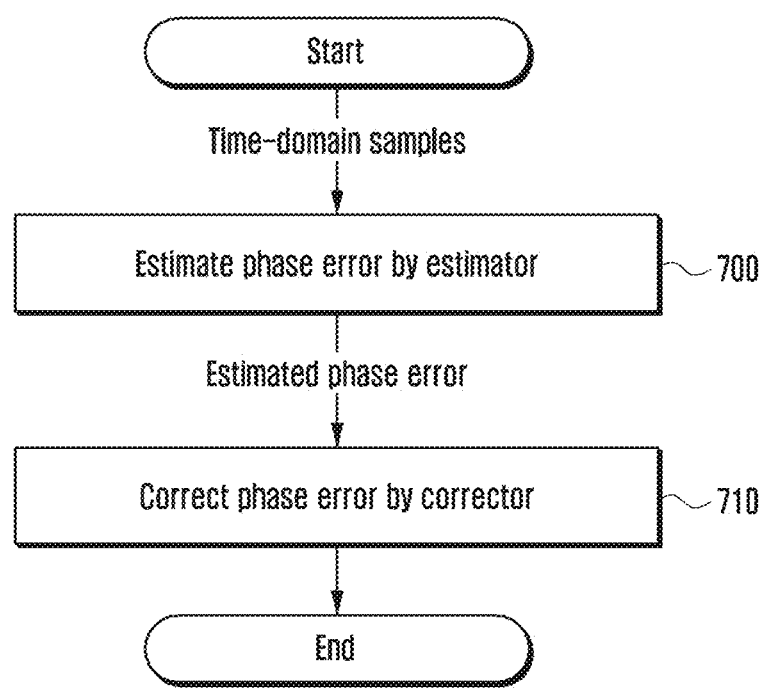
FIG. 7A illustrates a flowchart of a method for signal reception of the receiver according to embodiments of the present disclosure.

FIG. 7A illustrates a flowchart of a signal reception method for the receiver.

Referring to FIG. 7A, the receiver receives time-domain samples. Here, a sample is a unit of a time-domain signal, and received samples may be used interchangeably with a received signal. At step 700, the estimator of the receiver estimates the phase error on the basis of the received time-domain samples. At step 710, the corrector of the receiver corrects the phase error according to the estimated phase error.

Figure 7B:
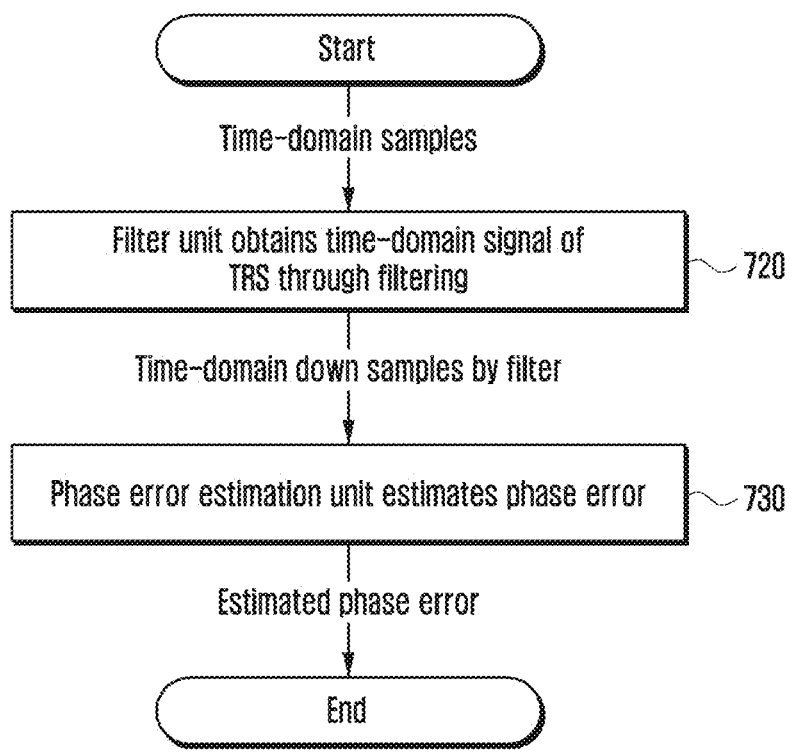
FIG. 7B illustrates a flowchart describing detailed receive operations performed by the estimator according to embodiments of the present disclosure.

FIG. 7B illustrates a flowchart describing detailed receive operations performed by the estimator.

Referring to FIG. 7B, at step 720, the filter of the estimator obtains a time-domain signal of TRS by filtering the received time-domain samples. At step 730, the phase error estimation unit of the estimator estimates the phase error on the basis of the filtered time-domain samples. The receiver may estimate the phase error by use of at least one of delay correlation, autocorrelation and partial correlation regarding the filtered time-domain samples. Which correlation to use may be determined according to the characteristics of the time-domain signal sent by the transmitter. The correlation to be used may be set in advance, or the transmitter may notify the receiver of the correlation type.

Figure 7C:
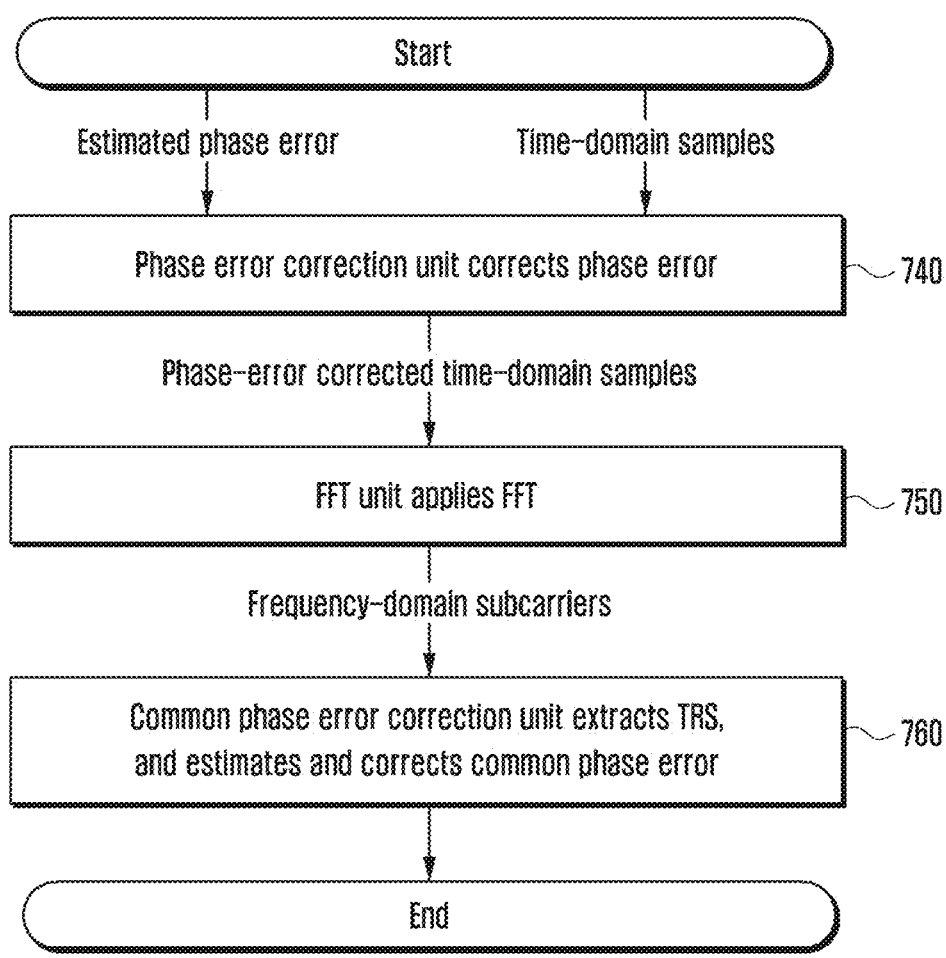
FIGS. 7C and 7D illustrate a flowchart describing detailed receive operations performed by the corrector according to embodiments of the present disclosure.
Figure 7D:
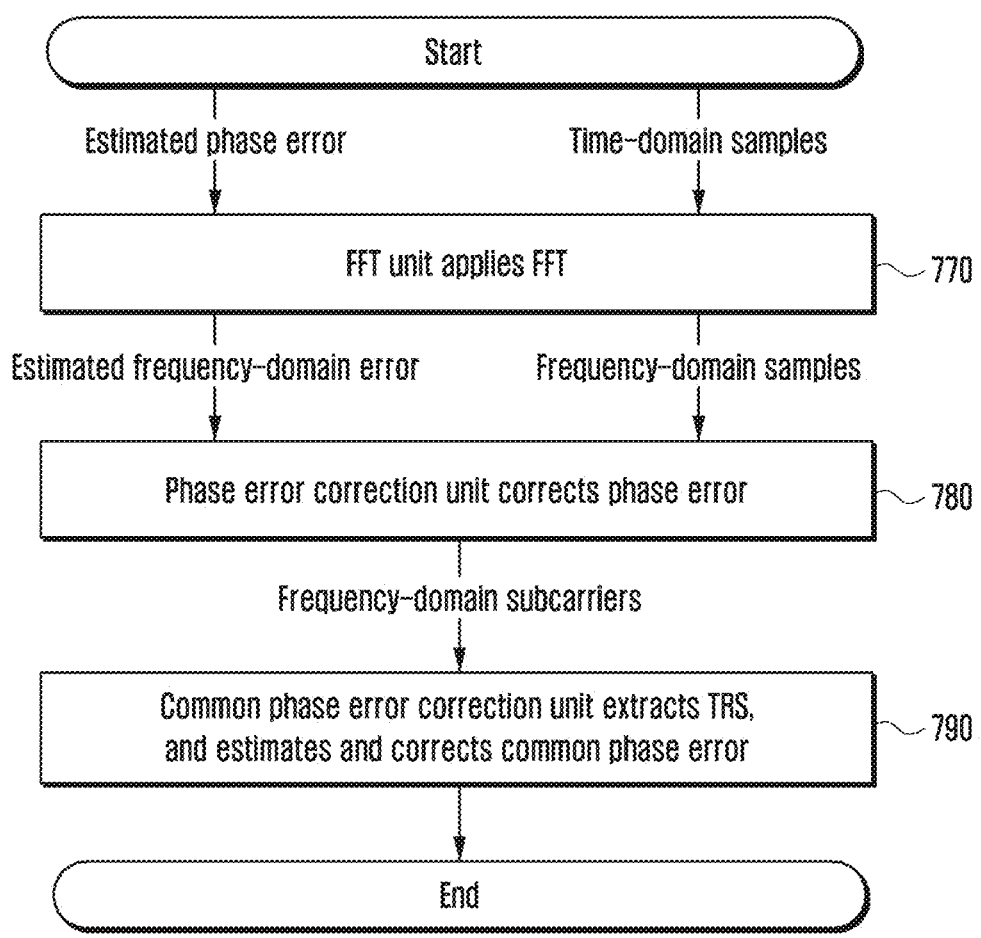

FIGS. 7C and 7D illustrate a flowchart describing detailed receive operations performed by the corrector. In FIG. 7C, the phase error is corrected on the basis of time-domain samples. In FIG. 7D, the phase error is corrected on the basis of frequency-domain samples.

Referring to FIG. 7C, at step 740, the phase error corrector of the corrector corrects the phase error on the basis of the estimated phase error and time-domain samples. Here, linear interpolation may be used to correct the estimated phase error. Phase error estimation and correction may be repeated. At step 750, the FFT of the corrector transforms the phase-error corrected time-domain samples to frequency-domain samples by applying FFT. At step 760, the common phase error corrector of the corrector extracts a frequency-domain signal {X(f)} from resources to which TRS is mapped among the FFT output, and estimates and corrects the common phase error on the basis of the extracted frequency-domain signal.

Referring to FIG. 7D, at step 770, the FFT of the corrector transforms the estimated phase error and time-domain samples respectively to the estimated frequency-domain phase error and frequency-domain samples by applying FFT. At step 780, the phase error corrector of the corrector corrects the phase error on the basis of the estimated frequency-domain phase error and frequency-domain samples. Here, circular convolution may be used to correct the estimated frequency-domain phase error. At step 790, the common phase error corrector of the corrector extracts a signal {X(f)} from resources to which TRS is mapped among the phase error corrected frequency-domain signals, and estimates and corrects the common phase error on the basis of the extracted signal.

In FIGS. 7A and 7D, steps are described in connection with specific components of the receiver. However, the present invention is not limited thereto or thereby.

Figure 8:
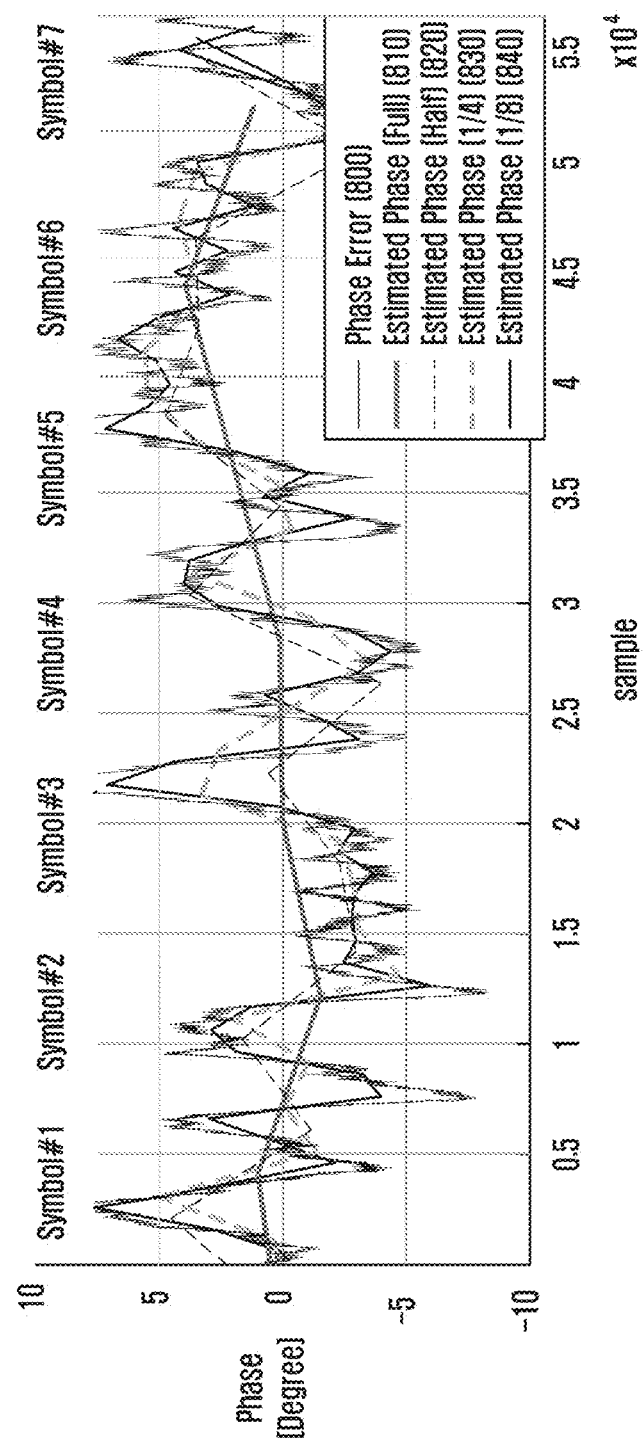
FIG. 8 illustrates an example estimated phase error values in the time domain according to embodiments of the present disclosure.

FIG. 8 illustrates an example estimated phase error values in the time domain.

In FIG. 8, each symbol is sampled 8192 times and 7 symbols are shown. Thin solid line 800 represents the phase error for received time-domain samples in FIG. 7. Thick solid line 810 represents phase error correction values obtained when phase error estimation is performed using correlations on a per-symbol basis and linear interpolation is applied. As the phase error changes greatly within a symbol, performing phase error correction once may result in a large variance as indicated by thick solid line 810. However, in the present invention, it is possible to perform phase error estimation multiple times within a symbol, effectively reducing the error. Thin broken line 820, thick broken line 830, and solid line 840 represent phase error correction values obtained when phase error estimation is performed within a symbol and linear interpolation is applied two times, four times, and eight times, respectively. It can be seen that the phase error correction values approach the phase error values indicated by thin solid line 800 with the increasing number of phase error estimations.

Figure 9:
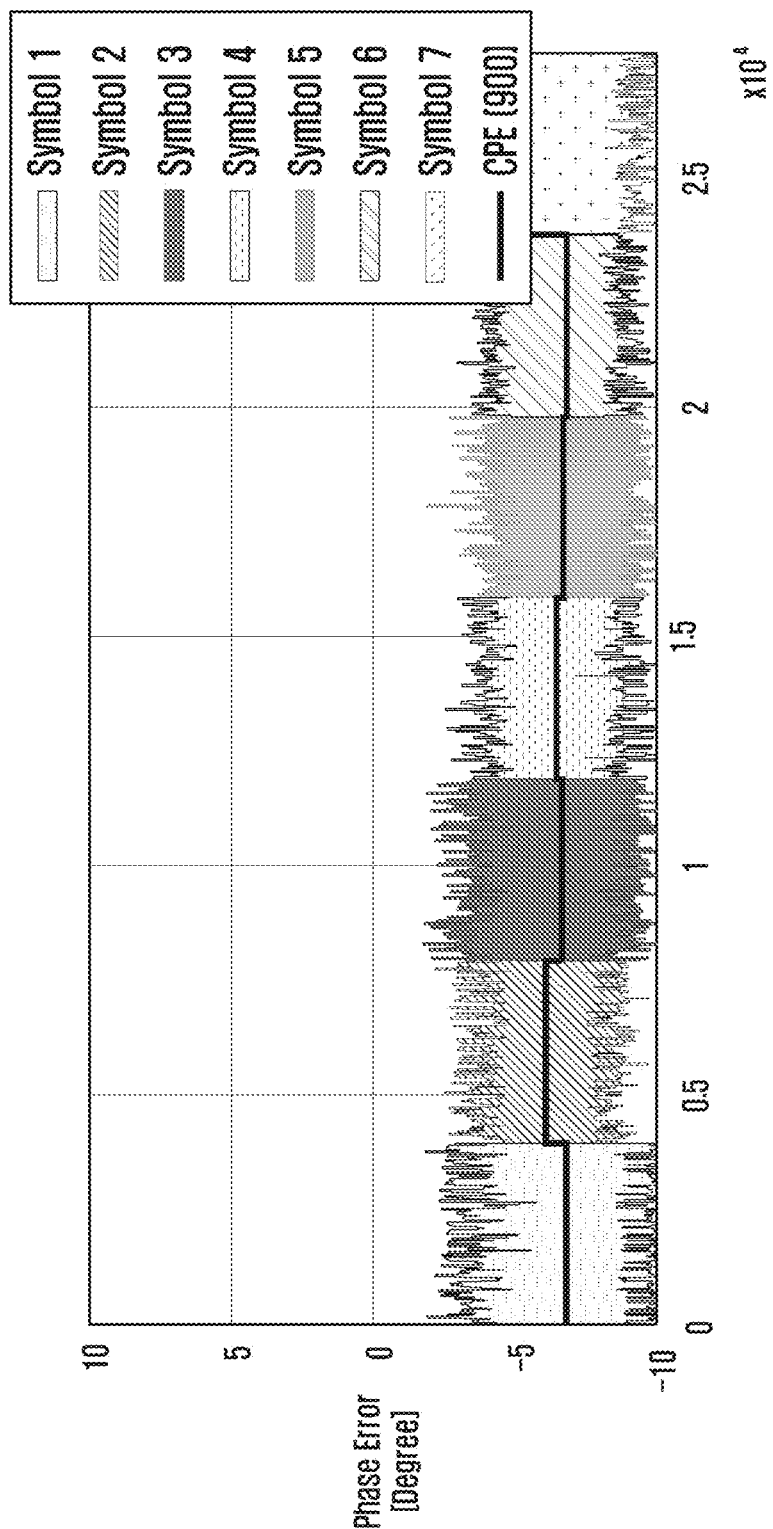
FIG. 9 illustrates an example phase error values for subcarriers on a per-symbol basis after phase error correction in the time domain and FFT are applied in sequence according to embodiments of the present disclosure.

FIG. 9 illustrates an example phase error values for subcarriers on a per-symbol basis after phase error correction in the time domain and FFT are applied in sequence.

In FIG. 9, thick solid line 900 represent the common phase error estimated through a frequency-domain signal {X(f)}. It can be seen that the common phase error is estimated quite well.

Table 1 represents reception performance of the receiver when the present invention is applied. Here, a millimeter wave phase noise model is applied to the transmitter and the receiver, and the error vector magnitude (EVM) is used as the reception performance index. Binary sequences are used as TRS, and phase error estimation within a symbol is performed eight times. It can be seen from Table 1 that an existing scheme can produce a performance gain of about 2 dB and the scheme of the present invention can produce an additional performance gain of about 7 dB compared with the existing scheme.

TABLE 1

| Correction | EVM(dB) |
|---|---|
| None | −23.12 |
| Existing scheme | −25.07 |
| Present invention | −32.03 |

Figure 10:
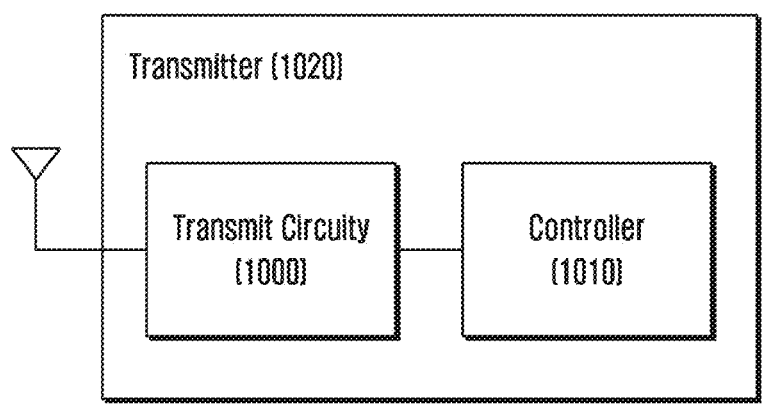
FIG. 10 illustrates an example transmitter according to embodiments of the present disclosure.

FIG. 10 illustrates an example transmitter.

Referring to FIG. 10, the transmitter may include a transmit circuitry 1000 and a controller 1010. The controller 1010 may generate sequences of TRS, determine a resource to which TRS is to be mapped, map TRS to the determined resource, and control the transmit circuitry 1000 to send TRS to the receiver. The transmit circuitry 1000 may send TRS and data to the receiver under the control of the controller 1010.

Figure 11:
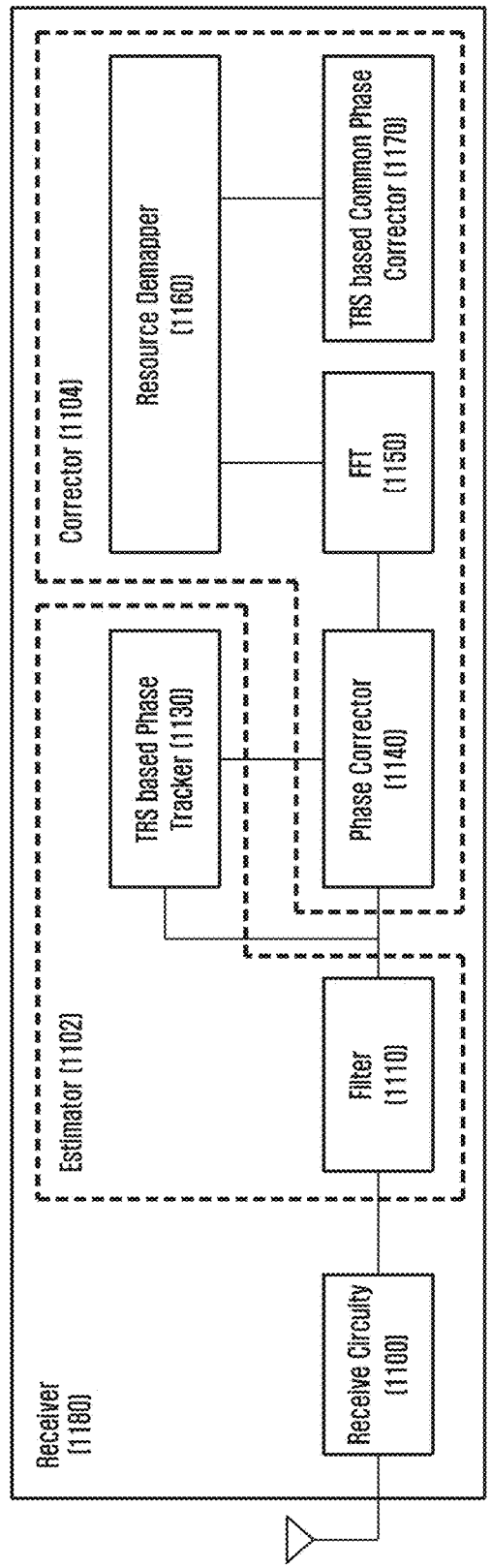
FIG. 11 illustrates an example receiver according to embodiments of the present disclosure.

FIG. 11 illustrates an example receiver.

Referring to FIG. 11, the receiver 1180 may include a receive circuitry 1100, a filter 1110, a phase tracker 1130 (TRS based phase tracker), a phase corrector 1140, a resource demapper 1160, a FFT 1150, and a common phase corrector 1170 (TRS based common phase corrector). Although not shown, the above components may operate under the control of a controller. The filter 1110 and phase tracker 1130 may constitute an estimator 1102. The phase corrector 1140, FFT 1150, resource demapper 1160, and common phase corrector 1170 may constitute a corrector 1104.

The receive circuitry 1100 may receive time-domain samples. The filter 1110 may filter the received time-domain samples. The phase tracker 1130 may estimate the phase error of the time domain in several sections within a symbol on the basis of the synchronized filtered samples (corresponding to the time-domain signal {x(t)} in FIG. 1).

The estimated phase error is input to the phase corrector 1140. The phase corrector 1140 corrects the estimated phase error on the basis of the synchronized samples. The phase corrector 1140 may utilize simple linear interpolation to correct the estimated phase error. The FFT 1150 transforms phase-error corrected time-domain samples into frequency-domain samples by applying FFT. The resource demapper 1160 extracts a signal (corresponding to the frequency-domain signal {X(f)} in FIG. 1) from resources to which TRS is mapped among the FFT output. The common phase corrector 1170 estimates and corrects the common phase error on the basis of the extracted frequency-domain signal, preventing performance degradation due to the phase error. Alternatively, the FFT 1150 may transform the estimated phase error and time-domain samples respectively to the estimated frequency-domain phase error and frequency-domain samples by applying FFT. The phase corrector 1140 may correct the phase error on the basis of the estimated frequency-domain phase error and frequency-domain samples. Here, the phase corrector 1140 may utilize circular convolution to correct the estimated frequency-domain phase error. The resource demapper 1160 may extract TRS from the phase error corrected frequency-domain signals. The common phase corrector 1170 may estimate and correct the common phase error on the basis of the extracted signal.

Figure 12:
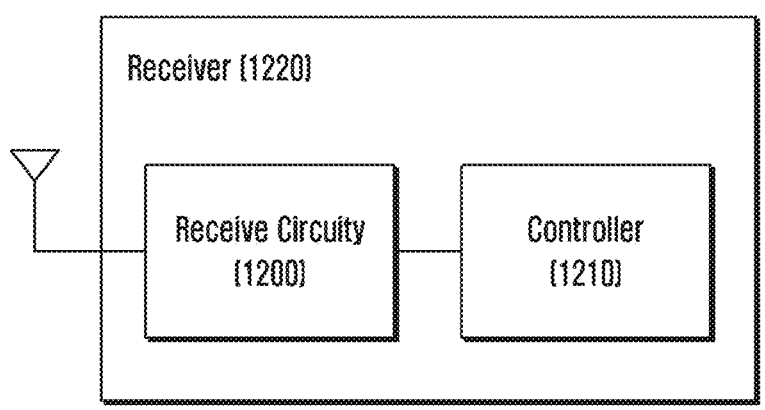
FIG. 12 illustrates another example receiver according to embodiments of the present disclosure.

FIG. 12 illustrates an example receiver.

Referring to FIG. 12, the receiver 1220 may include a receive circuitry 1200 and a controller 1210. The receive circuitry 1200 receives time-domain samples. The controller 1210 filters the time-domain samples, estimates the phase error on the basis of the filtered time-domain samples, and corrects the phase error on the basis of the estimated phase error. For phase error correction, the controller 1210 may use linear interpolation to correct the phase of time-domain samples, or may use circular convolution to correct the phase of frequency-domain samples after applying FFT. Estimation and correction of the phase error may be repeated. The controller 1210 may extract a signal from resources to which TRS is mapped among the FFT output, and estimate and correct the common phase error on the basis of the extracted signal.

In a feature of the present invention, the receiver may optimize signal reception performance through phase error estimation within a symbol.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of phase error estimation and correction for a receiver, the method comprising:
   receiving a time-domain reference signal generated based on a plurality of sequences determined by repeating a sequence set, the sequence set including sequences having a predetermined length;
   filtering the received time-domain reference signal; and
   estimating a phase error using the filtered time domain reference signal,
   wherein a correlation between at least two sections within a symbol associated with the time-domain reference signal is used for the phase error estimation within the symbol, and
   wherein each section corresponds to the sequences of the predetermined length.

2. The method of claim 1, further comprising:
   correcting the phase error using the estimated phase error within the symbol to the time-domain reference signal;
   converting the corrected phase error in the time-domain reference signal to a frequency domain signal using Fast Fourier Transform (FFT); and
   estimating a common phase error based on the frequency domain signal.

3. The method of claim 2, wherein the corrected phase error is determined based on a circular convolution scheme to be used for correcting an estimated frequency domain phase error.

4. The method of claim 1, wherein the correlation comprises at least one of a delay correlation, an autocorrelation, or a partial correlation.

5. The method of claim 1, wherein the estimated phase error is corrected based on a linear interpolation scheme.

6. The method of claim 1, further comprising estimating the phase error within the symbol based on synchronized filtered samples.

7. The method of claim 1, further comprising extracting a signal from resources to which tracking reference signal (TRS) is mapped among Fast Fourier Transform (FFT) outputs.

8. A receiver capable of phase error estimation and correction, comprising:
   a receive circuitry configured to receive a time-domain reference signal generated based on a plurality of sequences determined by repeating a sequence set, the sequence set including sequences having a predetermined length; and
   a controller configured to:
   control a process of filtering the received time-domain reference signal; and
   estimate a phase error using the filtered time-domain reference signal, wherein a correlation between at least two sections within a symbol associated with the time-domain reference signal is used for phase error estimation within the symbol, and
   wherein each section corresponds to the sequences of the predetermined length.

9. The receiver of claim 8, wherein the controller is further configured to:
   correct the phase error using the estimated phase error within the symbol to the time-domain reference signal;
   convert the corrected phase error in the time-domain reference signal to a frequency domain signal using Fast Fourier Transform (FFT); and
   estimate a common phase error based on the frequency domain signal.

10. The receiver of claim 9, wherein the corrected phase error is determined based on a circular convolution scheme to be used for correcting the estimated frequency domain phase error.

11. The receiver of claim 8, wherein the correlation comprises at least one of a delay correlation, an autocorrelation, and a partial correlation.

12. The receiver of claim 8, wherein the estimated phase error is corrected based on a linear interpolation scheme.

13. The receiver of claim 8, wherein the controller is further configured to estimate the phase error within the symbol based on synchronized filtered samples.

14. The receiver of claim 8, wherein the controller is further configured to extract a signal from resources to which TRS is mapped among Fast Fourier Transform (FFT) outputs.

15. A method for a transmitter to transmit a reference signal for phase error estimation, the method comprising:
   determining a plurality of sequences by repeating a sequence set, the sequence set including sequences having a predetermined length;
   generating a reference signal based on the plurality of sequences;
   determining a resource to which the reference signal is to be mapped;
   mapping the reference signal to the determined resource; and
   transmitting the mapped reference signal to a receiver, wherein the repeated sequences of the reference signal are correlated within a symbol of a time-domain and are used to estimate the phase error within the symbol by the receiver.

16. The method of claim 15, wherein the reference signal comprises a tracking reference signal (TRS).

17. The method of claim 15, further comprising transmitting data and the mapped reference signal to the receiver.

18. A transmitter capable of transmitting a reference signal for phase error estimation, comprising:
   a transmit circuitry configured to transmit a reference signal to a receiver; and
   a controller configured to:
   determine a plurality of sequences by repeating a sequence set, the sequence set including sequences having a predetermined length;
   generate a reference signal based on the plurality of sequences;
   determine a resource to which the reference signal is to be mapped;
   map the reference signal to the determined resource; and control the transmit circuitry to transmit the mapped reference signal to the receiver, wherein the repeated sequences of the reference signal are correlated within a symbol of a time domain and are used to estimate the phase error within the symbol by the receiver.

19. The transmitter of claim 18, wherein the reference signal comprises a tracking reference signal (TRS).

20. The transmitter of claim 18, wherein the controller is further configured to transmit data and the mapped reference signal to the receiver.

* * * * *